United States Patent [19]
Lane

[11] 3,942,478
[45] Mar. 9, 1976

[54] AUTOMATIC PET FEEDING APPARATUS

[76] Inventor: Derek Lane, 14183 Chalk Hill Road, Healdsburg, Calif. 95448

[22] Filed: Jan. 30, 1975

[21] Appl. No.: 545,478

[52] U.S. Cl. .................................... 119/51.12
[51] Int. Cl.² .................................... A01K 5/02
[58] Field of Search .......... 119/51.11–51.14, 56 R, 56 A, 63; 222/70

[56] References Cited
UNITED STATES PATENTS

| | | | |
|---|---|---|---|
| 3,532,075 | 10/1970 | Cooper | 119/51.12 |
| 3,658,036 | 4/1972 | Caracappa | 119/56 R |
| 3,720,186 | 3/1973 | O'Rourke | 119/51.12 |
| 3,782,332 | 1/1974 | Depenthal | 119/51.14 |

Primary Examiner—J. N. Eskovitz
Attorney, Agent, or Firm—Melvin R. Stidham

[57] ABSTRACT

An automatic pet feeder has several troughs, each with a lid hinged thereto. A T-shaped cam follower extends from each lid and rides against a cylindrical cam tube which makes a single revolution during the feeding period. I-shaped slots each extend partially around the tubular cam through a selected arc so that it underlies its associated cam follower at a desired time, wherein biasing means force the lid upward to swing the cam follower completely through the slot and hold the lid in open position.

8 Claims, 6 Drawing Figures

AUTOMATIC PET FEEDING APPARATUS

BACKGROUND OF THE INVENTION

Present automatic animal feeders generally provide some time means for dropping a quantity of food after a predetermined interval in time. Even if such devices were made repetitive, there is no provision for varying the types and quantity of food to satisfy an animal's food and water requirements over an extended period.

OBJECTS OF THE INVENTION

It is an object of this invention to provide an automatic pet feeder which is a single unit, has means for providing multiple feedings for one or more animals.

It is a further object of this invention to provide an automatic pet feeder which is easily handled and keeps the food protected and warm until it is made available to the animal.

It is a further object of this invention to provide an automatic pet feeder which will satisfy an animal's requirement for food and drink over an extended period.

It is a further object of this invention to provide an automatic pet feeder which will make available to an animal, different selected quantities of nourishment at different, predetermined intervals.

Other objects and advantages of this invention will become apparent from the description to follow when read in conjunction with the accompanying drawings.

BRIEF SUMMARY OF THE INVENTION

In carrying out this invention, I provide a unit with a plurality of troughs, each having a lid pivotally mounted thereon. A selected one of interchangeable cylindrical cam tubes is slowly rotated adjacent the lid to make a single revolution during the complete period of time over which the automatic feeder is to function. Extending from each lid is a T-shaped cam follower which rides on the outer cylindrical surface of the cam tube under light spring force or counter-balance weight, whereby the cam surface prevents the lid from opening. The cam followers are T-shaped and an I-slot partially surrounds the tubular cam in radial alignment with each cam follower. Hence, when the cross member of the T-bar overlies the upper cross member of the I-slot the cam member is free to rotate through the slot and out through the lower cross member of the I-slot whereby the light biasing means retains the lid in open position. The slot for each cam follower extends over a selected arcuate portion of the circumference of the cam tube, whereby different troughs will be uncovered at different periods making available to the animal, a complete feeding for the selected period of time of a single revolution.

DESCRIPTION OF A PREFERRED EMBODIMENT

Figure 2:
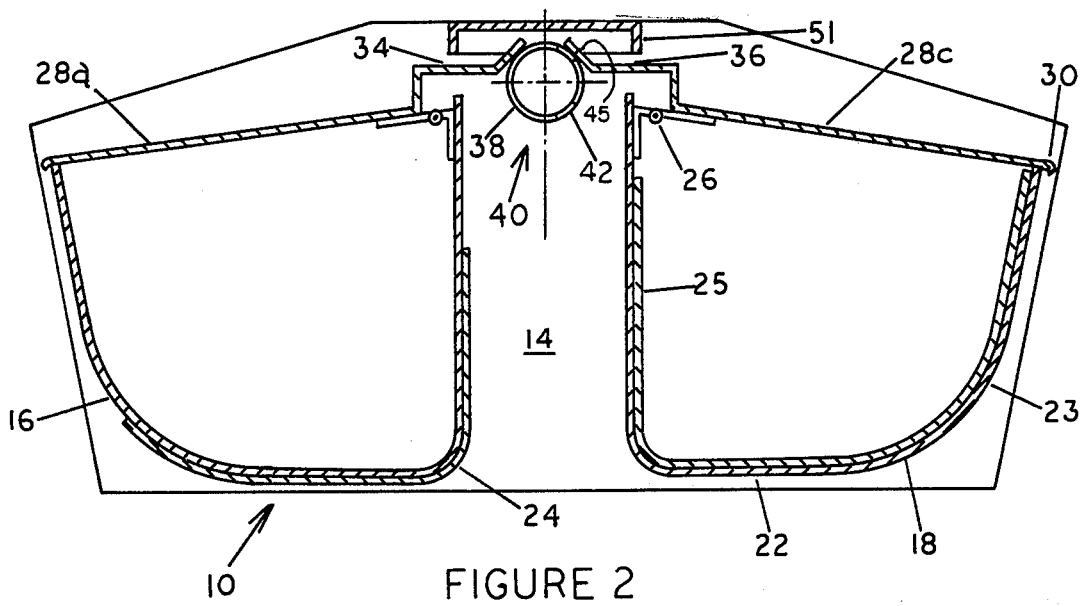
FIG. 2 is a vertical section view along line 2—2 of FIG. 1.
Figure 1:
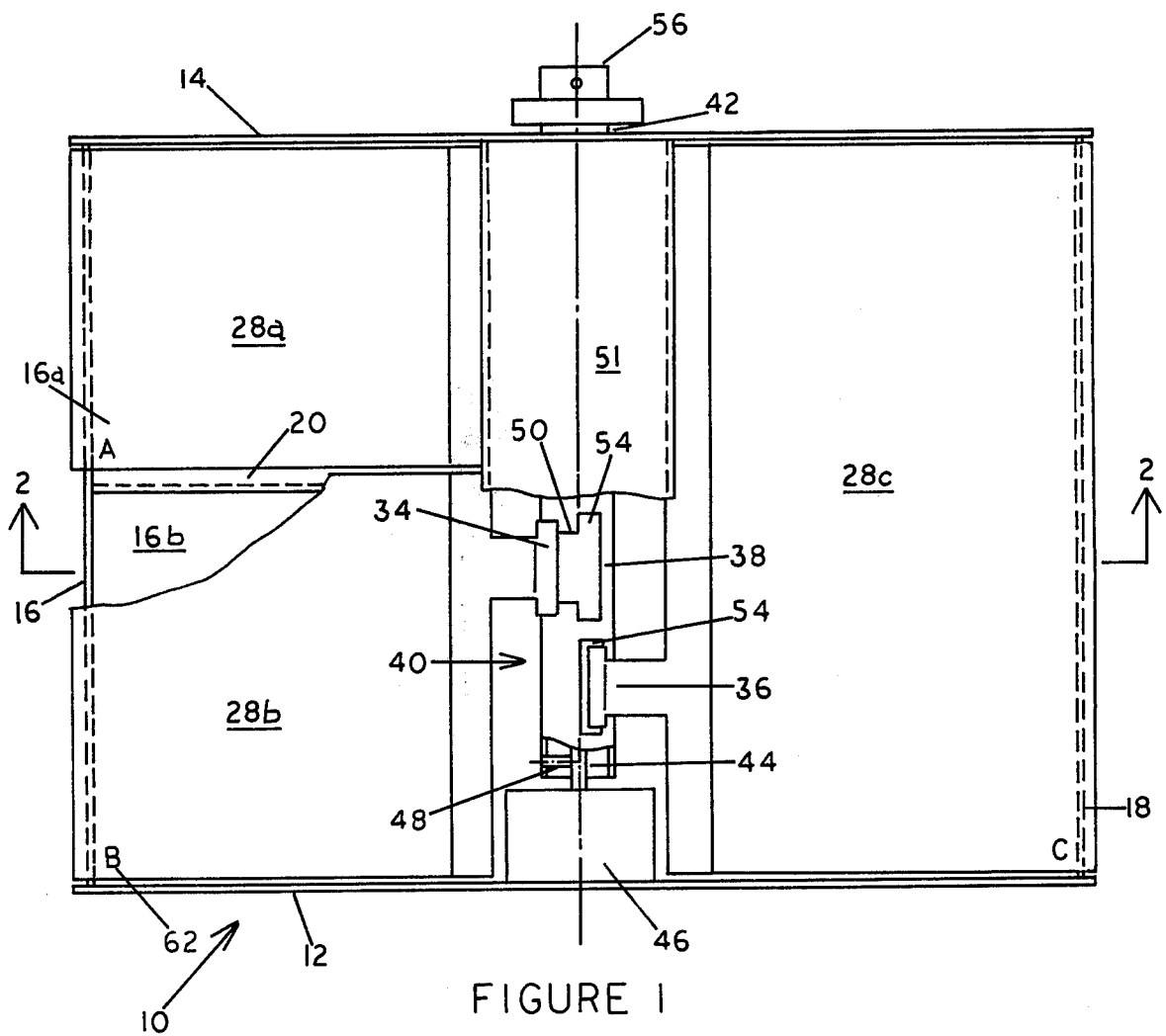
FIG. 1 is a top view partially broken away of an automatic pet feeder embodying features of this invention.

Referring now to FIGS. 1 and 2 with greater particularity, the automatic pet feeder 10 of this invention may comprise a pair of end walls 12 and 14 to which are welded, bonded or otherwise secured one or more troughs 16 and 18. If desired, at least one of the troughs may be compartmented at 16a, 16b by provision of a divider panel 20 or, when a substantial amount of food and drink is required at a single feeding, the trough may extend the full width between the end panels as shown at 18. In any event, the troughs are preferably secured to the end panels 12 and 14 so that, when the end panels are supported on a flat surface there is a ground clearance space 22 below the troughs. The front walls are sloped back as shown at 23 to enable an animal to stand as close as possible for feeding. In addition, when full, this places the center of gravity close to the middle of the feeder 10 for greater stability. If desired, some of the troughs may be provided with a suitable source of heat, such as a low wattage heating pad 24 bonded thereto, in order to keep the contents of the trough warm. Also, if desired the troughs may have removable liners 25 for ease of cleaning.

Hinged at 26 to the troughs are lids 28a, 28b, and 28c which normally keep the troughs covered to protect them against premature entry by the pet or by any intruding animal, and against exposure to the elements. In the latter connection the front edges 30 of the troughs are disposed at a level below that of the hinge connection 26 to enable runoff of rain and the like and to facilitate access for smaller animals. In the case of the trough compartmented at 20, each separate trough 16a and 16b is provided with a separate lid 28a and 28b and, or course, in the case of a single trough, the lid 28c extends the full width. In any event, each lid is provided with one or more T-shaped cam followers 34 and 36 extending therefrom to bear against the outer cylindrical surface of a cam tube timer 40, one end of which is rotatably carried in a suitable bearing member 42 in one end wall 14. The other end of the tube 40 is secured to the drive shaft 44 of a rotary drive 46, such as an electric or spring motor, carried on the other end wall 14. A set screw 48 in the cam tube 40 enables one to releasably secure the cam tube to the motor drive shaft 44 for quick replacement, whereby a series of cam tubes may be made interchangeable.

The cam tube 40 has a series of I-shaped key slots 50 therein (FIG. 4), each with cross slots 52 and 54 at both ends. The cross slots 52 and 54 are of a size and configuration to freely recieve the end of a T-bar cam follower 34 or 36. The key slots 50 are located over various arcuate portions of the circumference of the cylindrical cam tube 40, whereby the various T-shaped cam followers will be disposed opposite a complementary I-slot at various stages in the revolution of the tube. The hinges 26 by means of which the lids 28a 28b and 28c are secured to the troughs 16 and 18 are lightly counter-balanced by weights or springs, e.g. spring hinges 26, in order to maintain contact with the cam tube 40 and cam followers 34, 36 are preferably protected by a cowl 51 secured between the feeder end walls 12 and 14.

Figure 4:
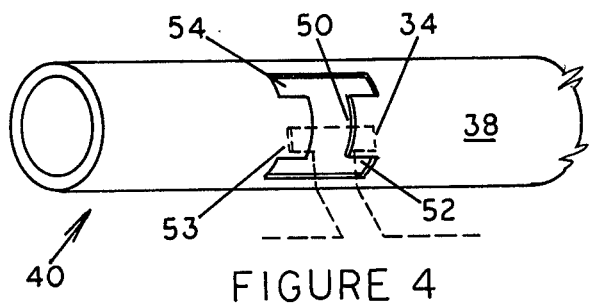
FIG. 4 is an isometric view of the cam tube.

For this purpose, the T-bar is angled at 45 with respect to the surface of the cam tube whereby with clockwise rotation in FIG. 4, the cross bar will span the cross slot and engage at 53 without dropping into the slot. This configuration of the T-bar enables operation in both sides of of the cam tube with unidirectional rotation.

Figure 3:
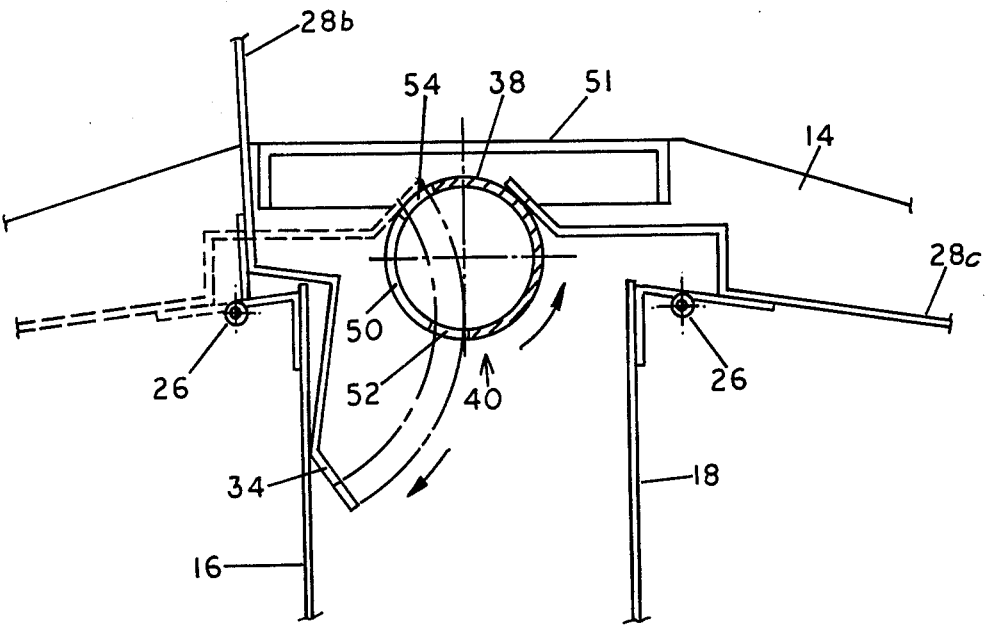
FIG. 3 is a partial section view showing the hinge cover and cam tube operations.

As shown in FIGS. 3 and 4, when the tubular cam 40 rotates to a position wherein the T-shaped cam follower 34 overlies the first oncoming cross slot 52, it is prevented from passing into the slot by engagement of the arm of the follower with the cylindrical tube surface 38 preceeding it. Similarly, as the web of the I-slot 50 passes under the T-bar 34, the T-bar spans the slot to preclude entry.

When the T-bar overlies the upper cross slot 54, it is free to pass completely through the tube 40, whereby the lid biasing means, the spring hinge 26, carries the lid 28b to the fully open position shown in solid lines. Having passed completely through the tube cam 40, the follower 34, in no way impedes further rotation of the tube, and the lid thereafter remains in the fully open position, allowing the animal to consume the contents of the particular trough immediately or at its leisure.

The drive motor 46 has suitable speed reducing means whereby the drive shaft 44 makes a single revolution, e.g. one revolution per day, during the complete period during which the animal is to be fed. In addition, it has one-way clutch on the output shaft 44, whereby the tube 40 may be set manually to any desired angular position by rotation of a knob 56 secured in the end thereof as by means of a pin 58. This enables the pet's master to set the tube 40 for desired trough opening times. A series of indicia 60 marked on the various lids whereby the settings may indicate the opening time for a particular lid. For example, with the indicator 61 pointing to the "B" marking the cam tube 40 may be disposed to enable opening of the lid 28b. Hence, the tube may be set in accordance with the time indicator markings 63 to start a predetermined time before reaching "B".

Figure 5:
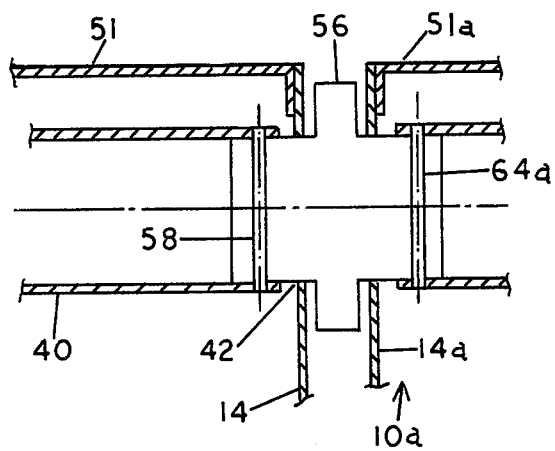
FIG. 5 is a partial section view showing one end of the cam tube and slave bushing connection.
Figure 6:
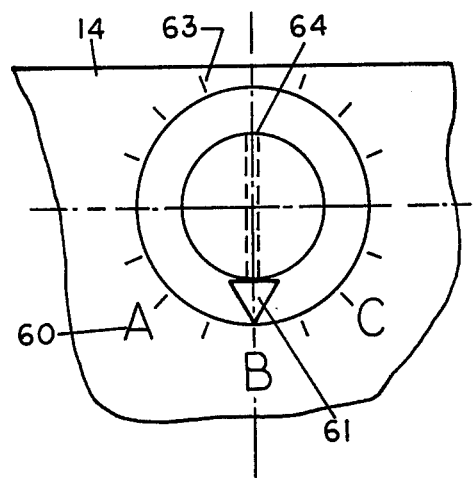
FIG. 6 is an end view of the timing tube adjustment knob.

The knob 56 may be of a suitable plastic such as Teflon to facilitate rotation in the bearing opening 42 in the end wall 14 and in addition it may be provided with a pin drive hole 64 whereby the tube of a slave animal feeder 10a (FIG. 5) may be coupled to it to provide a whole succession of feeding devices.

While this invention has been described in conjunction with a preferred embodiment thereof, it is obvious that modifications and changes therein may be made by those skilled in the art without departing from the spirit and scope of this invention as defined by the Claims appended hereto.

What I claim is:

1. A pet feeding device comprising:
    first and second troughs;
    first and second lids pivotally mounted on said troughs;
    means biasing said lids toward open position;
    first and second cam followers carried on said first and second lids, respectively;
    a cylindrical cam surface on a tube rotatable adjacent said first and second troughs engaged by said cam followers to hold said lids in closed position;
    means forming first and second arcuate slots in said cam surface in radial alignment with said first and second cam followers so that, when moved beneath said cam followers said slots enable said cam followers to pivot out of engagement with said cam surface as said biasing means open said lids; and
    a rotary drive member connected to said tube for moving said cam surface past said followers.

2. The pet feeding device defined by claim 1 wherein:
    said cam followers are T-shaped members extending from said lids outwards of the pivotal mounting therefor; and
    said slots are of I-configuration with cross slots at both ends thereof, of a size and shape and so disposed to enable an overlying T-shaped cam follower to pass freely therethrough.

3. The pet feeding device defined by claim 1 including:
    means for supporting said troughs on a flat surface but out of engagement therewith; and
    means for heating at least one of said troughs.

4. The pet feeding device defined by claim 1 wherein:
    said lids slope downward from said pivotal mounting toward the front end thereof.

5. The pet feeding device defined by claim 1 including:
    coupling means on one end of said tube adapted to drivingly connect said tube to a like cylindrical tube on a similar pet feeding device.

6. The pet feeding device defined by claim 1 including:
    means enabling manual rotation of said tube for angular setting thereof.

7. The pet feeding device defined by claim 1 wherein:
    said first and second troughs are disposed side by side.

8. The pet feeding device defined by claim 1 wherein said first and second troughs are disposed back to back with said cylindrical cam surface therebetween.

* * * * *